(12) United States Patent
Molin et al.

(10) Patent No.: US 10,055,643 B2
(45) Date of Patent: *Aug. 21, 2018

(54) ADVANCED BLENDING OF STITCHED IMAGES FOR 3D OBJECT REPRODUCTION

(71) Applicants: Hans M. Molin, Mission Viejo, CA (US); Andreas U. Kuehnle, Villa Park, CA (US); Marton Gyori, Budapest (HU)

(72) Inventors: Hans M. Molin, Mission Viejo, CA (US); Andreas U. Kuehnle, Villa Park, CA (US); Marton Gyori, Budapest (HU)

(73) Assignee: BENDIX COMMERCIAL VEHICLE SYSTEMS LLC, Elyria, OH (US)

( * ) Notice: Subject to any disclaimer, the term of this patent is extended or adjusted under 35 U.S.C. 154(b) by 120 days.

This patent is subject to a terminal disclaimer.

(21) Appl. No.: 14/491,024

(22) Filed: Sep. 19, 2014

(65) Prior Publication Data
US 2016/0086033 A1  Mar. 24, 2016

(51) Int. Cl.
*G06K 9/00* (2006.01)
*G06K 9/46* (2006.01)
(Continued)

(52) U.S. Cl.
CPC ............ *G06K 9/00671* (2013.01); *B60R 1/00* (2013.01); *G06K 9/00362* (2013.01); *G06K 9/00805* (2013.01); *G06K 9/4652* (2013.01); *G06K 9/78* (2013.01); *G06T 7/174* (2017.01); *G06T 7/90* (2017.01); *H04N 5/225* (2013.01); *H04N 7/181* (2013.01); *H04N 13/239* (2018.05); *B60R 2300/105* (2013.01); *B60R 2300/304* (2013.01);
(Continued)

(58) Field of Classification Search
None
See application file for complete search history.

(56) References Cited

U.S. PATENT DOCUMENTS 6,421,463 B1 * 7/2002 Poggio .............. G06K 9/00228
382/224
6,923,080 B1 8/2005 Dobler et al.
(Continued)

OTHER PUBLICATIONS

International Search Report and Written Opinion of corresponding International Application No. PCT/US2015/040830, dated Oct. 30, 2015, 14 pages.
(Continued)

*Primary Examiner* — Said Broome
(74) *Attorney, Agent, or Firm* — Fay Sharpe LLP (57) ABSTRACT

When blending individual vehicle-mounted camera images into a coherent composite image of the vehicle surroundings, objects in the respective images are analyzed to determine the presence of a pedestrian. When the individual images are blended to form the composite image, multiple pedestrian shadow views of the pedestrian are replaced with background pixels to erase the pedestrian, and a semi-symbolic graphical representation of the pedestrian is superimposed at the location of the actual pedestrian in the composite image. The graphical representation is proportional to the pedestrian in the composite image and includes features unique to the pedestrian it represents. The composite image with the graphical representation is then presented to a viewer.

27 Claims, 10 Drawing Sheets (51) Int. Cl.
    *G06K 9/78*     (2006.01)
    *H04N 5/225*     (2006.01)
    *H04N 7/18*     (2006.01)
    *B60R 1/00*     (2006.01)
    *H04N 13/239*     (2018.01)
    *G06T 7/174*     (2017.01)
    *G06T 7/90*     (2017.01)

(52) U.S. Cl.
    CPC .................. *B60R 2300/802* (2013.01); *G06T 2207/20221* (2013.01); *G06T 2207/30196* (2013.01); *G06T 2207/30232* (2013.01); *G06T 2207/30252* (2013.01)

(56) References Cited

U.S. PATENT DOCUMENTS

| | | |
|---|---|---|
| 6,956,469 B2 | 10/2005 | Hirvonen et al. |
| 7,388,476 B2 * | 6/2008 | Nagaoka ................ B60K 35/00 340/435 |
| 7,672,510 B2 | 3/2010 | Nagaoka et al. |
| 7,786,898 B2 | 8/2010 | Stein et al. |
| 2002/0196340 A1 * | 12/2002 | Kato ........................ B60R 1/00 348/148 |
| 2007/0229238 A1 | 10/2007 | Boyles et al. |
| 2012/0219183 A1 * | 8/2012 | Mori ........................ G06T 7/20 382/103 |
| 2013/0093851 A1 | 4/2013 | Yamamoto et al. |
| 2014/0176551 A1 | 6/2014 | Heisele |

OTHER PUBLICATIONS

Kim et al., "Augmenting aerial earth maps with dynamic information from videos," Virtual Reality, Springer-Verlag, LO, vol. 15, No. 2-3, Jan. 11, 2011, pp. 185-200.

Silva et al., "Automatic camera control in virtual environments augmented using multiple sparse videos," Computers & Graphics, Elsevier, GB, vol. 35, No. 2, Jan. 22, 2011, pp. 412-421.

Philip Kelly, "Pedestrian detection and tracking using stereo vision techniques," Mar. 1, 2008, retrieved from the internet: http://doras.dcu.ie/109/, pp. 84-87, section 4.3.2, figure 4.8.

* cited by examiner

ADVANCED BLENDING OF STITCHED IMAGES FOR 3D OBJECT REPRODUCTION

BACKGROUND

The present application finds particular application in realistically representing objects in surround-view vehicle imaging systems. However, it will be appreciated that the described techniques may also find application in other vehicle monitoring systems, other imaging systems, or other vehicle safety systems.

One conventional approach to object representation relates to an image generator that recognizes a three dimensional object in a single overhead image and outputs the attributes of the three dimensional object. The resulting display includes a ground location of the object based on the overhead image to indicate to a driver the actual location and size of the object. Such conventional approaches do not compensate for differences between multiple images of the object from different vantage points in a surround view composite image.

Typical surround-view or birds-eye view systems use different methods of stitching multiple images together. The primary focus for these stitching methods is typically to achieve a seamless real-looking view of the ground. Objects raised above ground, such as poles, pedestrians or other three dimensional objects are not reproduced well, if at all. This deficiency can create a potentially unsafe situation when the user of the system relies on the visual image to monitor vehicle surroundings for obstacles, thus reducing the utility and value of the system.

When a pedestrian is facing only one of the cameras in a surround view system, then a front view of the pedestrian is seen in one camera view and the pedestrian's back is seen in the other. Conventional stereo vision algorithms, which rely on identifying corresponding points on an object, cannot deal with these two entirely different views, and so fail; i.e., there is no match to be found, so there is no disparity and hence no depth in the composite image of the object.

The present innovation provides new and improved systems and methods that facilitate realistically representing objects such as pedestrians near a vehicle in a composite surround view image generated from multiple camera images while incorporating real-world features of the pedestrian for presentation to a driver, which overcome the above-referenced problems and others.

SUMMARY

In accordance with one aspect, a system that facilitates detecting an object in a surround-view image of a vehicle and superimposing a semi-symbolic graphical representation of the object in the surround-view image comprises a first camera that captures a first image of an object, and a second camera that captures a second image of the object. The system further comprises a processor configured to generate a composite image by merging the first and second images, analyze the composite image to detect one or more features indicative of the object in the composite image, and replace object pixels with corresponding background pixels. The processor is further configured to generate a semi-symbolic graphical representation of the object that comprises one or more object features detected in the first and second images, insert the semi-symbolic graphical representation of the object into the composite image at a calculated position of the object relative to the vehicle, and output the composite image with the semi-symbolic representation to a display.

In accordance with another aspect, a method of detecting an object in a surround-view image of a vehicle and superimposing a semi-symbolic graphical representation of the object in the surround-view image comprises capturing a first image, from a first vantage point, of an object, capturing a second image, from a second vantage point, of the object, generating a composite image by merging the first and second images, and analyzing the composite image to detect one or more features indicative of the object in the composite image. The method further comprises replacing object pixels with corresponding background pixels, generating a semi-symbolic graphical representation of the object that comprises one or more object features detected in the first and second images, inserting the semi-symbolic graphical representation of the object into the composite image at a calculated position of the object relative to the vehicle, and outputting the composite image with the semi-symbolic representation to a display.

In accordance with another aspect, a processor is configured to execute computer-executable instructions for detecting an object in a surround-view image of a vehicle and superimposing a semi-symbolic graphical representation of the object in the surround-view image, the instructions comprising capturing a first image, from a first vantage point, of an object, capturing a second image, from a second vantage point, of the object, and generating a composite image by merging the first and second images. The instructions further comprise analyzing the composite image to detect one or more features indicative of the object in the composite image, replacing object pixels with corresponding background pixels, generating a semi-symbolic graphical representation of the object that comprises one or more object features detected in the first and second images, inserting the semi-symbolic graphical representation of the object into the composite image at a calculated position of the object relative to the vehicle, and outputting the composite image with the semi-symbolic representation to a display.

In accordance with another aspect, an apparatus that facilitates detecting an object in a surround-view image of a vehicle and superimposing a semi-symbolic graphical representation of the object in the surround-view image comprises means for capturing a first image, from a first vantage point, of an object, means for capturing a second image, from a second vantage point, of the object, means for generating a composite image by merging the first and second images, and means for analyzing the composite image to detect one or more features indicative of the object in the composite image. The apparatus further comprises means for replacing object pixels with corresponding background pixels, means for generating a semi-symbolic graphical representation of the object that comprises one or more object features detected in the first and second images, means for inserting the semi-symbolic graphical representation of the object into the composite image at a calculated position of the object relative to the vehicle, and means for outputting the composite image with the semi-symbolic representation to a display.

Still further advantages of the subject innovation will be appreciated by those of ordinary skill in the art upon reading and understanding the following detailed description.

BRIEF DESCRIPTION OF THE DRAWINGS

The innovation may take form in various components and arrangements of components, and in various steps and arrangements of steps. The drawings are only for purposes of illustrating various aspects and are not to be construed as limiting the invention.

DETAILED DESCRIPTION

The foregoing problems are overcome by the herein-described systems and methods, which facilitate providing an advanced processing system for displaying views of three dimensional objects in a surround view multi-camera system. The images are blended to preserve the view of the three dimensional objects. The three dimensional objects can be a pedestrian, a bicyclist, a motorcyclist or other object that includes human features. In one arrangement, two cameras capture a pedestrian from two different viewing angles. The intersection of the viewing range determines both the height and location of the pedestrian. In the blended image, the pedestrian appears as two shadows, which may confuse a driver and therefore are replaced by a single height proportional symbol on the image displayed to the driver. In this manner, only one view of the pedestrian is provided to the driver. The 3D object, such as a pedestrian, found in two different images is thus reconciled into one recognizable image for display to the driver.

Figure 1:
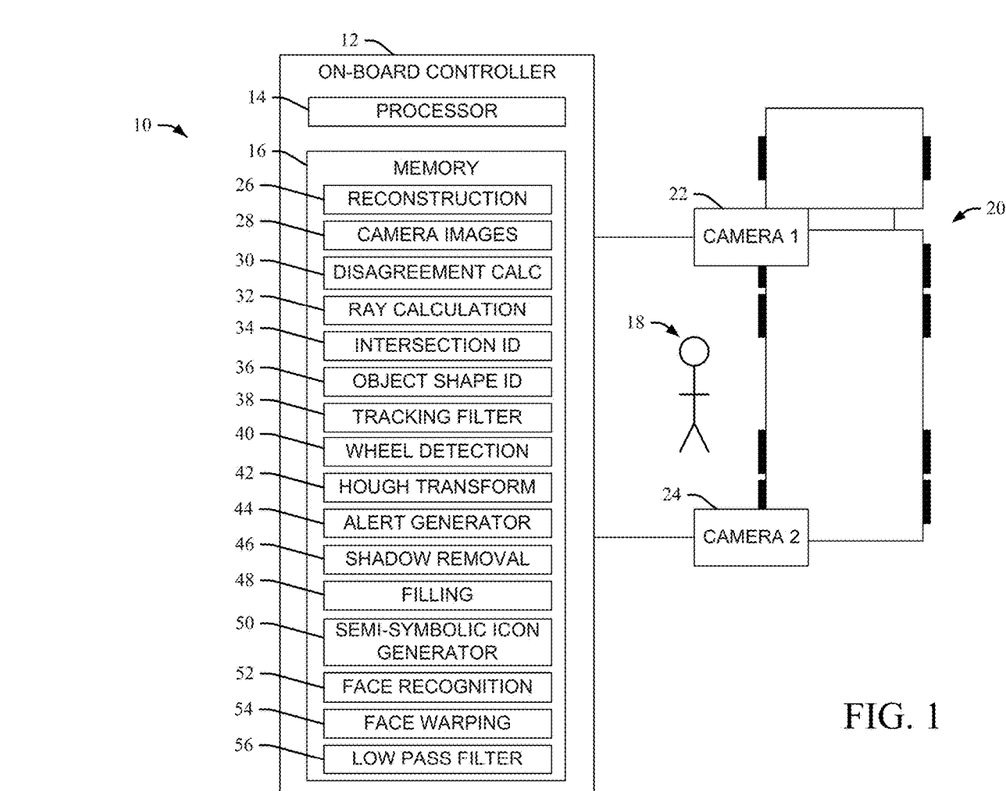
FIG. 1 illustrates a system that facilitates blending images captured by multiple cameras into a surround view image and replacing multiple "shadow" images of an object such as a pedestrian with a semi-symbolic graphic that reduces driver confusion, in accordance with one or more aspects described herein.

FIG. 1 illustrates a system 10 that facilitates blending images captured by multiple cameras into a surround view image and replacing multiple, duplicative or "shadow" images of an object such as a pedestrian with a semi-symbolic graphic that increases the correspondence of the display with the reality of the images, in accordance with one or more aspects described herein. The system 10 includes an onboard controller 12 comprising a processor 14 that executes, and a memory 16 that stores, computer-executable instructions (e.g., modules, routines, programs, applications, etc.) for performing the various methods, techniques protocols, etc., described herein. In contrast to conventional approaches, the system 10 facilitates detecting a pedestrian 18 using multiple camera views and tracking pedestrian position relative to the vehicle 20. A first camera 22 is mounted to a first corner of the vehicle, and a second camera 24 is mounted to a second corner of the vehicle in order to provide overlapping fields of view of the side of the vehicle. It will be appreciated that although only two cameras are depicted in FIG. 1 and described for exemplary purposes, more than two cameras can be employed in conjunction with the various embodiments described herein. For instance, cameras can be mounted at each corner of the vehicle, including but not limited to corners of a tractor and/or corners of a trailer on a tractor-trailer combination vehicle. The cameras can also be mounted on the front or rear of the vehicle. This system is useful with any variety of camera placements that provide an overlapping image view.

According to one or more embodiments herein, the two cameras 22, 24 view the same object or pedestrian 18, and produce two views. The bottom of the object or pedestrian will be in the same location in a bird's eye view image thereof. Rather than display one or both of the two views of the pedestrian or object directly in the display, which may confuse the driver, instead the two views are replaced with a single reality-based symbol or graphical representation. The position of the graphical representation is derived by calculating the pedestrian's foot location, such as where the bottom of a "V" 308 (see, e.g., FIG. 3) created by the dual views is located. The height of the graphical representation corresponds to the real object/pedestrian height. For instance, stereo detection methods (e.g. locate the ends of the V for a pedestrian, which correspond to the head, perform 3D ray intersection calculation, and determine the real head height) produce the real head height, and the symbol height can be made proportional to the real object/pedestrian height.

The graphical representation is reality-based to assist the user in understanding what the graphical representation represents, and also to better link what the user eventually sees (in reality) to what has already has been seen in the symbolic display (for instance, a pedestrian wearing red pants in the blind spot is first visible as a graphical representation with red pants, only on the display; as the pedestrian then walks around the truck and the driver sees him, wearing red pants, the driver easily understands how the pedestrian has moved. The coupling of the graphical representation to the real world can be by color, texture, height, etc. For instance, an average color of the pedestrian's torso can be determined (e.g., by pixel differences), and then the symbol's torso is colored same shade. In one embodiment, the pedestrian can be divided into multiple zones corresponding to the legs, the torso, and the head. The division into zones is done by looking for color or gray level contrasts, or if these are not visible (e.g. where the pedestrian is wearing only dark colors), then fixed percentages of the object height can be employed to locate the legs (e.g. bottom 50% corresponds to the legs, next 40% corresponds to the torso, top 10% corresponds to the head and neck). The final result is a better understood, less cluttered, surround view display of the surroundings of the vehicle.

The memory 16 may include volatile memory, non-volatile memory, solid state memory, flash memory, random-access memory (RAM), read-only memory (ROM), programmable read-only memory (PROM), erasable programmable read-only memory (EPROM), electronic erasable programmable read-only memory (EEPROM), variants of the foregoing memory types, combinations thereof, and/or any other type(s) of memory suitable for providing the described functionality and/or storing computer-executable instructions for execution by the processor 14. Additionally, "module," as used herein denotes a set of computer-executable instructions (e.g., a routine, sub-routine, program, application, or the like) that is persistently stored on the computer-readable medium or memory for execution by the processor.

In one embodiment, the processor receives image data from each of the cameras 22, 24, and executes a reconstruction module 26 that reconstructs the image data into camera images 28 that can be stitched together to form a surround-view of the vehicle. In one example, the processor generates a composite image that includes both a front view of the pedestrian 18 as captured by the first camera 22, and a rear view of the pedestrian 18 as captured by the second camera 24. The front and rear views of the pedestrian may be reconstructed to appear as shadow or "ghost" features in the image, such that the views of the pedestrian appear transparent to a degree (see, e.g., FIG. 8).

The processor executes a disagreement calculation module 30 that calculates an area of disagreement between the two images used to form the composite image by identifying areas that do not agree in the two images to determine that there is a three dimensional object in the image. That is, images generated by each camera 22, 24 are analyzed and compared to identify an area of disagreement D between the respective images. For instance, the limits of the area of disagreement are identified by the processor, e.g., by pixel analysis or the like. The processor executes a ray calculation module 32 that calculates rays or lines emanating from each camera through its field of view. That is, rays are drawn or calculated by the processor to emanate from each camera to the boundaries of the more distant half (relative to each camera) of the area of disagreement D. A ray intersection identification module 34 identifies an intersection R of camera views or rays, wherein the intersection corresponds to a highest point of the pedestrian 18 (or other object, such as a cyclist or the like) as determined by analysis of the area of disagreement D in the images. That is, using knowledge of the camera locations and the area of disagreement, the highest point on the pedestrian 18 is determined and tracked.

The calculated rays outline a "shadow" of the pedestrian, seen from each camera's vantage point. The calculated rays intersect over the pedestrian's head. In one example, the processor scans the pixels defining the area of disagreement and calculates where the rays intersect. The highest point of intersection is identified by the processor as an approximation to the pedestrian's head location. Each camera's view is re-projected onto the ground plane, which is assumed to be flat. When a pedestrian 18 interrupts the respective camera's view of the ground plane, the ground plane projections disagree and the pedestrian is detected.

In another embodiment, the processor executes an object shape identification module 36 that identifies a shape formed by the front view and the rear view representations of the object in the composite image. For instance, an object such as a pedestrian approaching from behind the vehicle toward the front of the vehicle, e.g., at an intersection, can be detected. The cameras 22, 24 are calibrated such that the ground plane views generated by the cameras match. That is, an object entirely in the ground plane is seen as being the same by both cameras. Where two camera views disagree and do not generate the same, overlapping, ground plane view as determined by the disagreement calculation module, the pedestrian is detected. The location at which the lines intersect is determined to be where the pedestrian feet are located, and when viewed in 3D, the height at which the lines intersect is taken as an approximation of the location of the pedestrian's head over the ground. This location (i.e., the pedestrian's head) is then tracked. An approximately constant height over the ground is assumed, and a tracking filter 38 (e.g., Kalman or alpha-beta) with gating is employed when tracking a pedestrian's head. Persistent and consistently moving detections at a plausible or predefined height constitute a pedestrian detection and are indicated to the driver of the vehicle in a surround view image on a display or user interface (not shown) (e.g., by a red bar extending forward from the back of the truck, up to the pedestrian's location, to signify a danger zone for the driver).

According to another embodiment, a V-shape formed in the composite image by the front and rear shadows of the pedestrian is detected and used to confirm that the object is a pedestrian. For instance, a front view image of a pedestrian generated by the first camera 22 and a rear view image of the pedestrian generated by the second camera 24 are merged.

In the case of a cyclist, a front view image of a cyclist generated by the first camera 22 and a rear view image of the cyclist generated by the second camera 24 are merged. Ellipses corresponding to the bicycle wheels are identified by a wheel identification module 40. The bicycle wheels have a limited range of sizes, come in pairs, and move together. In one embodiment, a Hough transform module 42 (e.g., a voting based scheme for which lines/circles/ellipses/ general shapes best match an image) or the like is executed by the processor to find ellipses. The ellipses overlap and are substantially of the correct size to facilitate confirmation of the ellipses as corresponding to a set of bicycle wheels. The constellations of ellipses are thus detected and tracked over time. Once a cyclist (or pedestrian) is detected, an alert generator 44 generates an alert signal that is received by the processor, which in turn generates a visual alert on the surround-view image to draw the driver's attention to the cyclist (or pedestrian).

In another embodiment, once the object has been identified as a pedestrian (or cyclist), and the pedestrian height and location have been determined, a process for replacing the front and rear view shadows of the pedestrian in the blended image is performed. For instance, the processor executes a shadow removal module 46 that removes shadow images of the pedestrian that appear when the individual camera images are blended. Once the pedestrian shadow images are removed, the processor executes a filling module 48 that fills in the pixel gaps left by shadow removal. For instance, a pedestrian shadow image captured by the first camera is replaced with background pixels corresponding to the same image location and captured by the second camera. Similarly, a pedestrian shadow image captured by the second camera is replaced with background pixels corresponding to the same image location and captured by the first camera. Once the pedestrian shadow images have been replaced with background pixels, the processor executes a semi-symbolic icon generator 50 that generates a graphic representing the pedestrian and including one or more real-world features of the pedestrian (e.g., height, shirt color, pant color, etc.). The semi-symbolic graphic is inserted into the blended image at the determined location of the pedestrian and having a height and width congruent to the pedestrian's height and width. Alternatively, the semi-symbolic graphic can be a rectangular prism with the height, width and coloration of the pedestrian.

The processor can also execute a facial recognition module 52 that analyzes image data of the pedestrian's face and identifies a facial image having a clarity or resolution above a predetermined threshold. A facial warping module 54 is executed by the processor to place the identified facial image onto the semi-symbolic graphic, thereby improving realism and aiding recognition. The clothing coloring of the pedestrian may be subjected to a low pass filter 56 to avoid flickering effects while still allowing for coloration changes due to changing lighting. In addition, the saturation of the colors can be increased or modulated to improve seeing the pedestrian in the surround view, particularly where the pedestrian has low gray level contrast to the background. The pant and/or shirt color is identified and similar colors are rendered in the semi-symbolic graphic to improve graphic realism.

Consideration is also given to blind spots or areas that the driver cannot see with the rear view mirrors, and particular highlighting can be provided for pedestrians in these areas. Articulation angle of the vehicle (e.g., for a tractor-trailer combination vehicle or the like) and the direction of vehicle motion may be considered in determining blind spots.

Figure 2A:
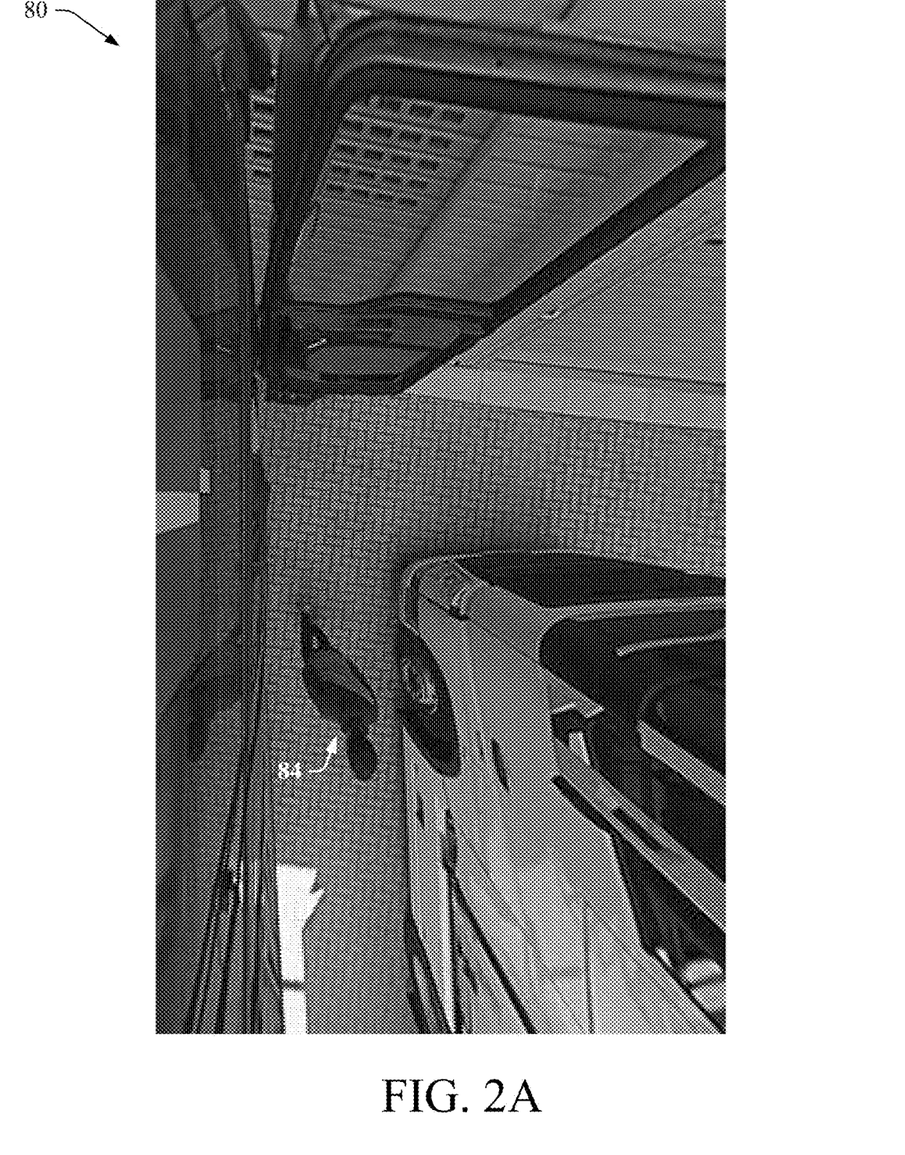
FIGS. 2A and 2B show images of a pedestrian seen by two cameras.
Figure 2B:
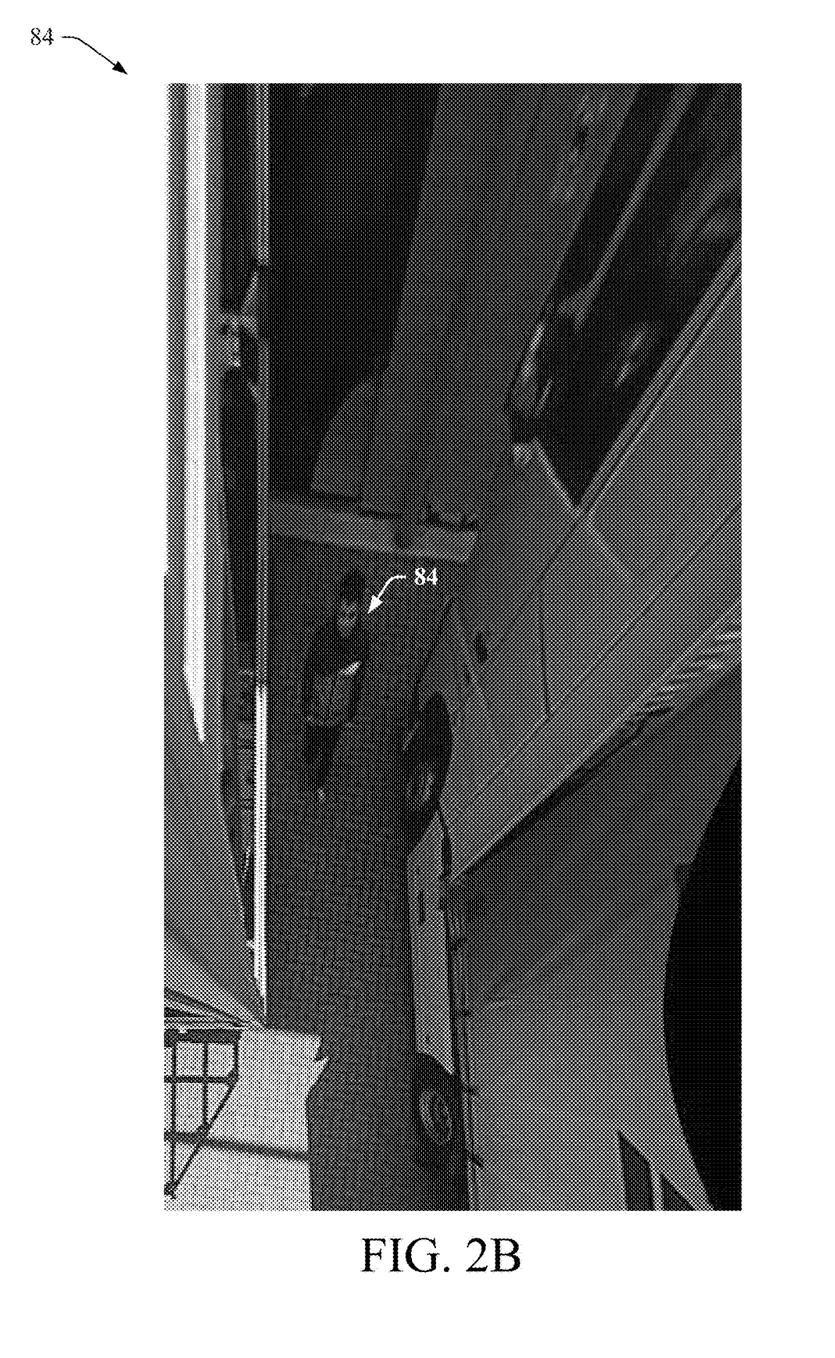

FIGS. 2A and 2B show images 80, 82, respectively, of a pedestrian 84 seen by two cameras. In the image 80 of FIG. 2A, the back of the pedestrian is seen. In the image 82 of FIG. 2B, the front of the pedestrian is seen. Driver assistance cameras placed on the sides of a vehicle typically produce an overlapped view at the corners of the vehicle. When the cameras are placed at the corners of the vehicle looking downward, as described herein, then there is an overlapped view that extends completely around the vehicle. In these overlapped areas, a pedestrian is seen twice, from different sides, by two cameras. The question then arises as to which side of the pedestrian (or object) should be displayed to the driver. Displaying both views is confusing to the driver. Accordingly, the described systems and methods facilitate reconciling differing camera views and combining the camera views to generate one reality-related, or "semi-symbolic" symbol using one or more characteristics of the pedestrian.

Figure 3:
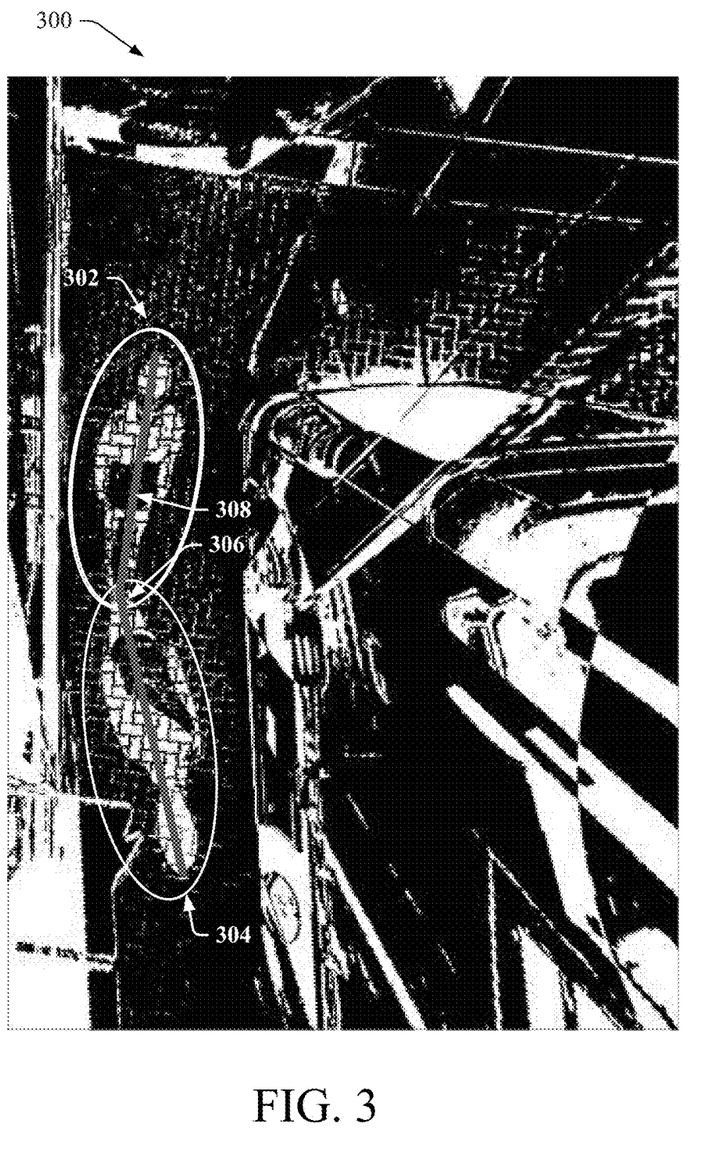
FIG. 3 is an image of a passing pedestrian as seen by two cameras, wherein images generated by the two cameras are overlapped, in accordance with one or more aspects described herein.

However, once the cameras have been calibrated to produce a bird's eye surround view, regions are identified where the views of the two cameras do not agree, such as where the gray or color levels are significantly different (e.g., above a predetermined gray level difference threshold) in a sufficiently large (e.g., above a predetermined area threshold), contiguous area. These areas represent the projective "shadows" of the pedestrian. FIG. 3 shows an example of such shadows.

FIG. 3 is an image 300 of a passing pedestrian as seen by two cameras, wherein images generated by the two cameras are overlapped, in accordance with one or more aspects described herein. An object such as a pedestrian approaching from behind the vehicle to the front of the vehicle, e.g., at an intersection, can be detected. The detection is performed using stereo cameras viewing the detection zone and by dynamic modeling of the pedestrian location. For instance, a pair of stereo cameras that view the area near the vehicle are provided, such as are described with regard to FIG. 1. The cameras are calibrated such that the ground plane views generated by the cameras match. That is, an object entirely in the ground plane is seen as being the same by both cameras (e.g., there is no image difference between the two cameras).

A pedestrian, being over the ground plane, does not result in a matched view. To illustrate this example, the pedestrian in FIG. 3 is seen both from both a front view 302 and a rear view 304, and only at the feet 306 are the two views shared. The two camera views disagree and do not generate the same overlapping ground plane view where the pedestrian is visible. Just over the shadow ends corresponding to the pedestrian's head, visible at the ends of the red lines, where the flat ground plane background is again seen by the cameras, the views agree again. The limits of the area of disagreement are identified by the processor, and rays can be drawn or calculated by the processor to emanate from each camera to the boundaries of the more distant half (relative to each camera) of the area of disagreement. These rays outline a "shadow" of the pedestrian, seen from each camera's vantage point. The tops of the shadows representing the pedestrian in the image correspond to the top of the pedestrian, and their furthest point from the camera indicates which ray passes just over the pedestrian's head. The intersection of these rays is calculated, as described with regard to FIG. 1. This intersection, along with the calibration, determines the height of the pedestrian and where the pedestrian's feet are located. That is, the point of intersection of the rays corresponds to the location of the pedestrian's feet, and the length of the ray from the point of intersection to the top of the pedestrian's head in the shadow image corresponds to the height of the pedestrian. These locations form a "V" shape 308 (shown in red for visibility) that can be detected and used to determine pedestrian feet position and height. Where the lengths of the rays differ from the intersection to the top of the pedestrian's head in the respective shadow images, they may be averaged or one may be selected over the other according to a predetermined metric or randomly. This information forms the basis of the semi-symbolic replacement image described herein.

Figure 4:
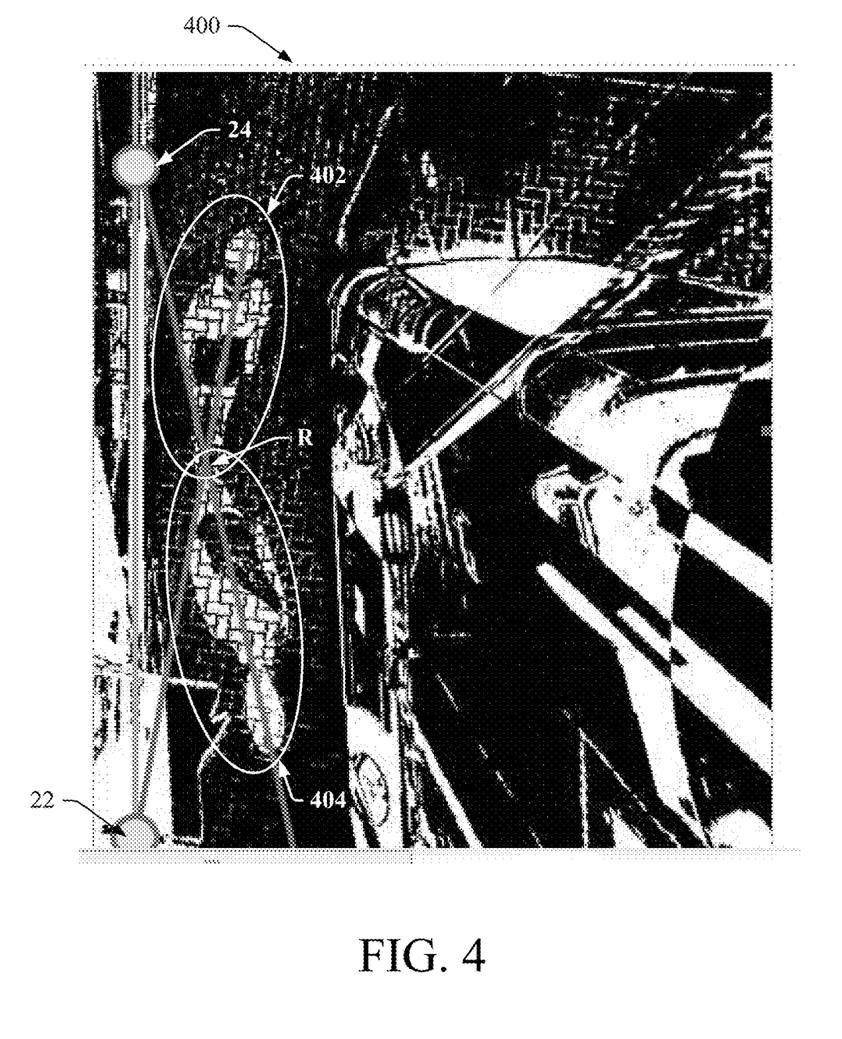
FIG. 4 shows an example of a merged image in which an intersection of rays R has been identified.

FIG. 4 shows an example of a merged image 400 in which an intersection of rays R has been identified. Two cameras 22, 24 are positioned at or near the corners of the vehicle, and capture respective front and rear views 402, 404 of the object, which collectively define an area of disagreement between the two camera images. A line or ray is drawn from each camera to the furthest point of the cyclist's or pedestrian's shadow (the head in this example). That is, a ray emanating from each camera is defined and extends to a more distant half of the area of disagreement. In FIG. 4, the more distant half of the area of disagreement relative to the camera 22 is the front view shadow image 402 of the pedestrian. Similarly, the ray emanating from camera 24 extends to the furthest point in the more distant half of the area of disagreement relative to camera 24, which is the is the rear view shadow image 404 of the pedestrian. In one example, the lines intersect at point R over the location of pedestrian's feet in the 2D representation of FIG. 3, but as seen in 3D, the height at which the lines intersect is where the pedestrian's head is positioned over the ground. This location (i.e., the pedestrian's head) is then tracked. An approximately constant height over the ground is assumed. A tracking filter (e.g., Kalman or alpha-beta) with gating is employed when tracking a pedestrian's head. Sufficiently persistent and consistently moving detections at a plausible height constitute a pedestrian detection and are indicated to the driver of the vehicle (for instance, by a red bar extending forward from the back of the truck, up to the pedestrian's location, which can signify a danger zone for the driver).

Figure 5:
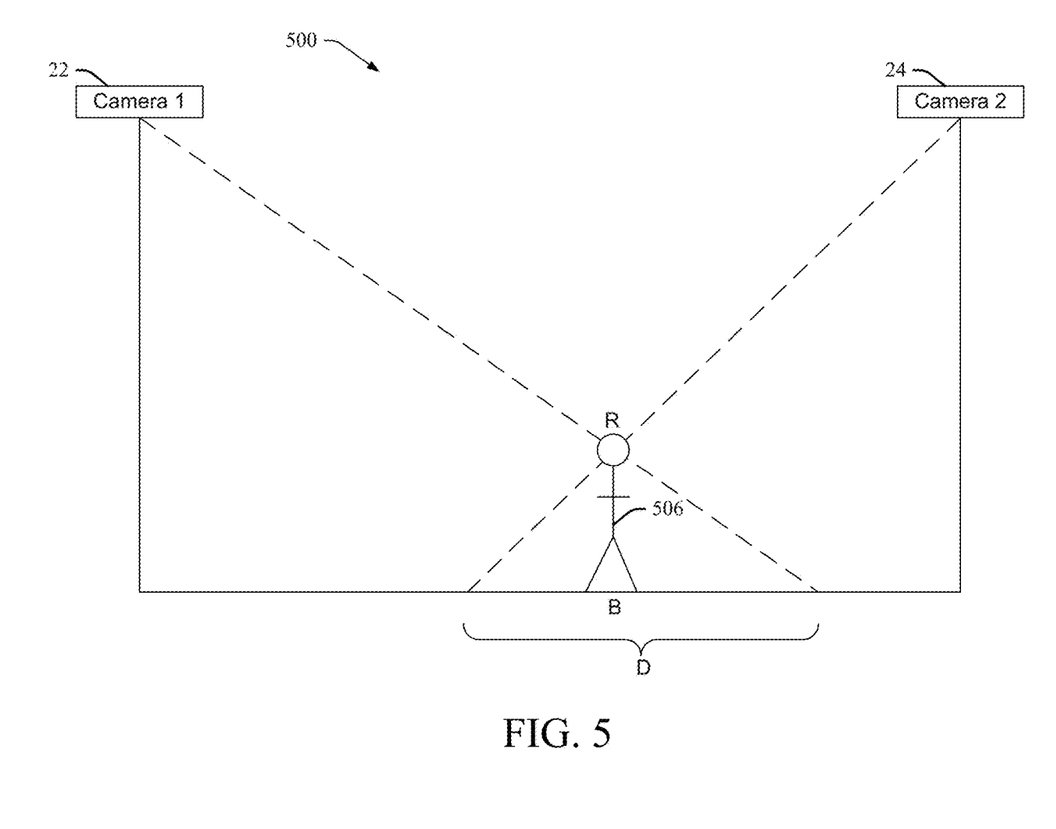
FIG. 5 illustrates a diagram wherein the first camera and second camera image an object.

FIG. 5 illustrates a diagram 500 wherein the first camera 22 and second camera 24 image an object 506 (e.g., a pedestrian). Images generated by each camera are analyzed and compared to identify an area of disagreement D between the respective images, and an intersection of camera views R that denotes a highest point of the object 506 as determined by analysis of the area of disagreement D in the images. The head projects to the far end of each pedestrian's 'shadow'. That is, using knowledge of the camera locations and the area of disagreement, the highest point on the object is determined and tracked. Each camera's view is re-projected onto the ground plane, which is assumed to be flat. When an object 506 interrupts the respective camera's view of the ground plane, the ground plane projections disagree and the object is detected. The intersection of the rays at point R is used to determine both the height of the object and its position relative to the vehicle. Once the height and position are determined, the images are stitched together to form a surround view image, and the object is replaced with a semi-symbolic graphic that represents the pedestrian.

In one embodiment, the intersection of two rays determines the height and base location of the pedestrian. In 3D, the rays become intersecting planes or surfaces, and the midpoint of their intersection is over the base point B. Displaying both pedestrian shadows (i.e., front and back views) in a surround view can be confusing to the viewer. Therefore, both shadows are replaced by a single semi-symbolic view or graphic that is based on the pedestrian's actual appearance.

As discussed with regard to FIG. 1, the first step is to erase both shadows and replace the shadow pixels with background pixels visible to the opposite camera. For instance, if the first camera captures the rear-view of the pedestrian, then when the rear-view shadow is removed, background pixels from the front camera image are used to replace it, and vice versa. The confusing double view of the pedestrian is thus eliminated.

The second step is to place a semi-symbolic representation of the pedestrian onto the previously calculated spot where the pedestrian is standing, with a height proportional to the pedestrian's height, and with colors or gray levels taken to copy that of the pedestrian in different zones. For instance, if the pedestrian is wearing textured blue pants up to 1 meter in height, the symbol has the same color textured blue pants, up to this same height (and so on, for the shirt, dress, shoes, hair, hat, etc.). The symbol's width is proportional to the pedestrian's width also, so that a reality-based icon represents the person, in the correct place.

Figure 6:
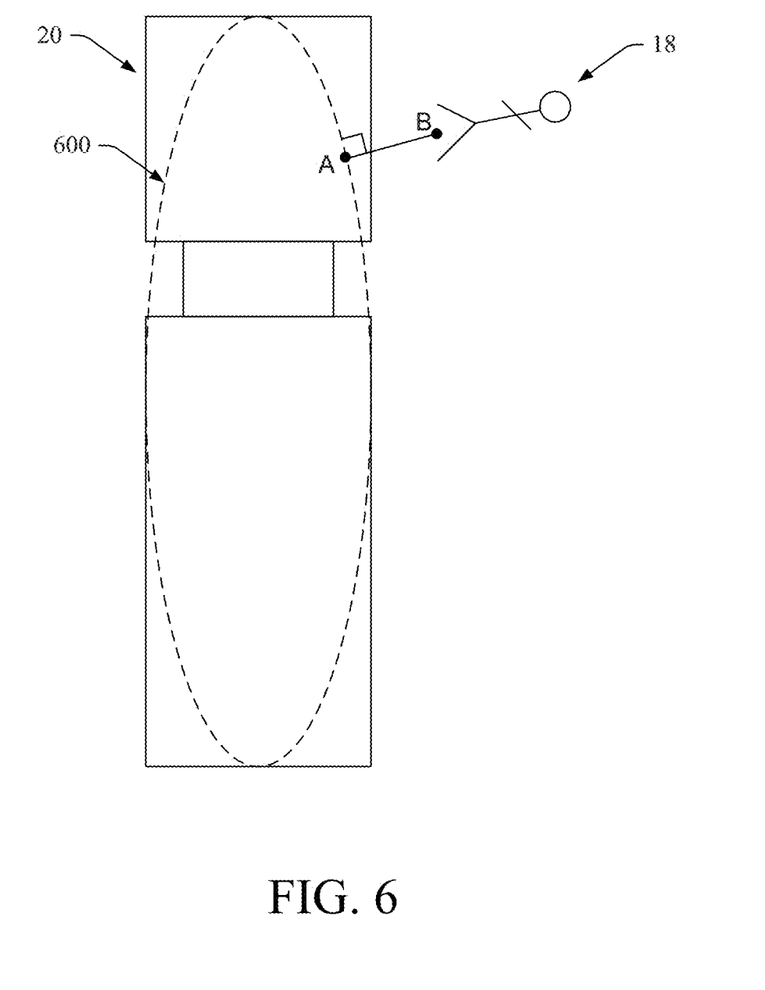
FIG. 6 illustrates a diagram of the vehicle, in which an ellipse is calculated about the truck for determining an angle of the pedestrian relative to the vehicle.

FIG. 6 illustrates a diagram of the vehicle 20, in which an ellipse 600 is calculated about the truck for determining an angle of the pedestrian 18 relative to the vehicle. The pedestrian symbol 'leans away' from the camera, at an angle given by a radius from the vehicle center to the base of the pedestrian. Alternatively, an ellipse that encases or fits within the vehicle may be defined. The perpendicular direction to the nearest ellipse point A to the base point B of the pedestrian defines the angle of the pedestrian in the display. The ellipse may enclose the vehicle or be enclosed thereby.

Figure 7:
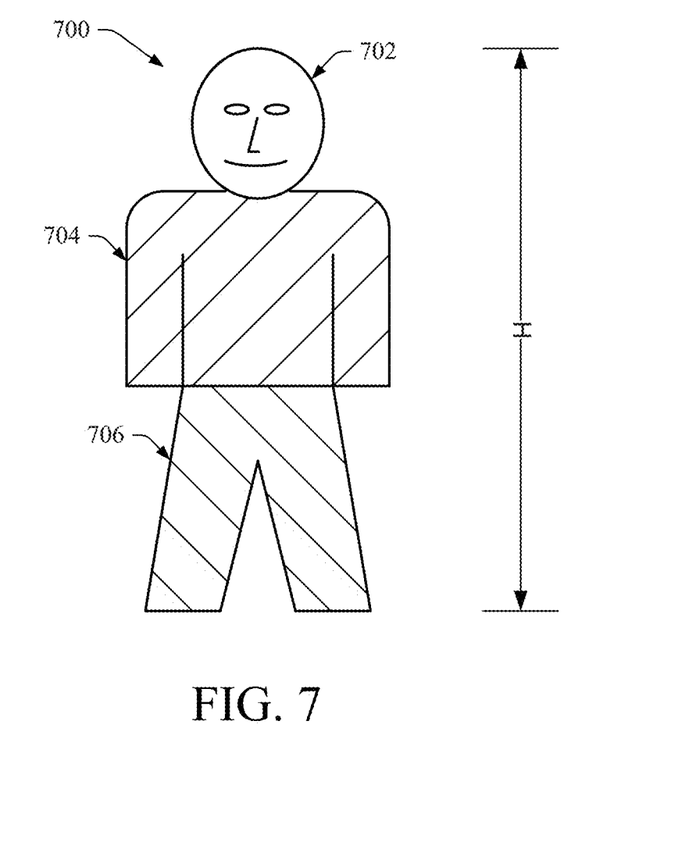
FIG. 7 illustrates a semi-symbolic graphical representation of the pedestrian, such as may be employed to represent the pedestrian in the surround view image on a display presented to a driver.

FIG. 7 illustrates a semi-symbolic graphical representation 700 of the pedestrian, such as may be employed to represent the pedestrian in the surround view image on a display presented to a driver. The graphical representation 700 comprises a head portion 702, a torso portion 704, and a leg portion 706. The graphical representation has a height, in pixels, that is proportional to the actual height of the pedestrian as determined by pixel analysis of the individual camera images and/or the composite blended image. The head portion 702 may be colored to approximate the pedestrian's skin tone. In another embodiment, the head portion may comprise an image of the pedestrian's face as captured by one of the cameras. The torso portion and the leg portion can be colored and/or textured to approximate the color of the pedestrian's shirt and pants, respectively. In one example, the color of the leg portion of the graphical representation is determined by averaging pixel colors in the bottom 50% (or some other percentage) of the pedestrian as captured by the cameras. Similarly, the color of the torso portion of the graphical representation is determined by averaging pixel colors in the upper portion or central percentage (e.g., from 50-90%) of the pedestrian as captured by the cameras. In this manner, a semi-symbolic graphical representation of the pedestrian is generated for insertion into the surround view image and includes real-world features associated with the pedestrian.

Figure 8:
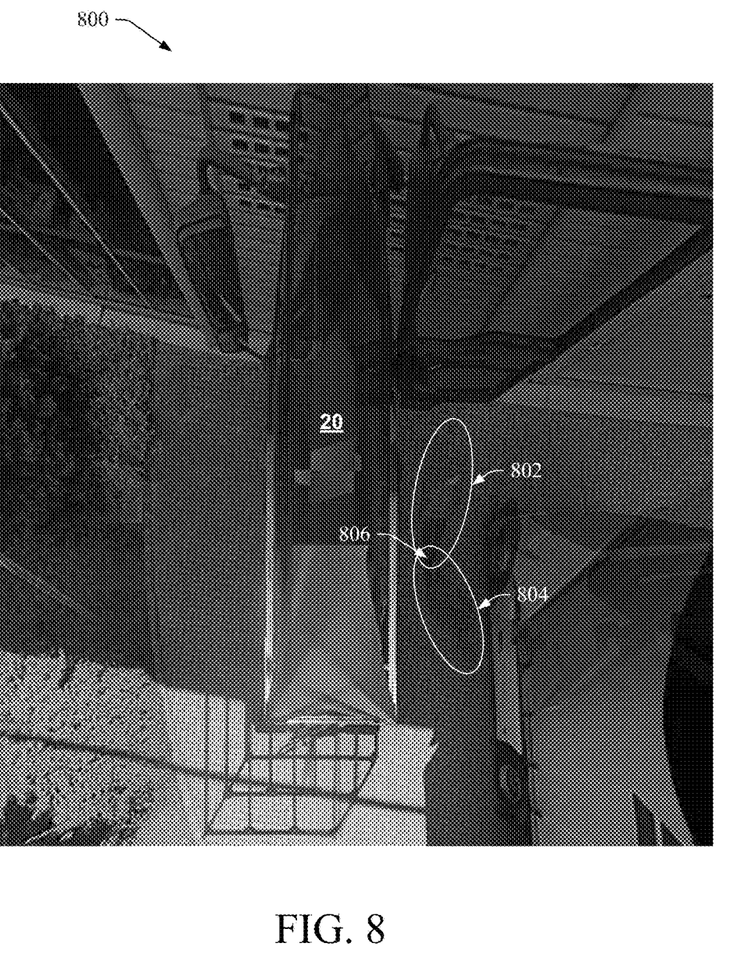
FIG. 8 is a blended surround view image of the vehicle, in which pedestrian shadows or "ghosts" are visible.

FIG. 8 is a blended surround view image of the vehicle 20, in which pedestrian shadows or "ghosts" 802 and 804 are visible. The pedestrian shadow 802 is a front view of the pedestrian captured by a first camera, and the pedestrian shadow 804 is a rear view of the pedestrian captured by a second camera. The shadows 802 and 804 intersect at a region 806 corresponding to the pedestrian's feet. Accordingly, the semi-symbolic icon or graphical representation can be positioned at the location 806. The pedestrian position is tracked relative to the vehicle and the position of the graphical representation is adjusted to move with the pedestrian in the surround view image or video.

Figure 9:
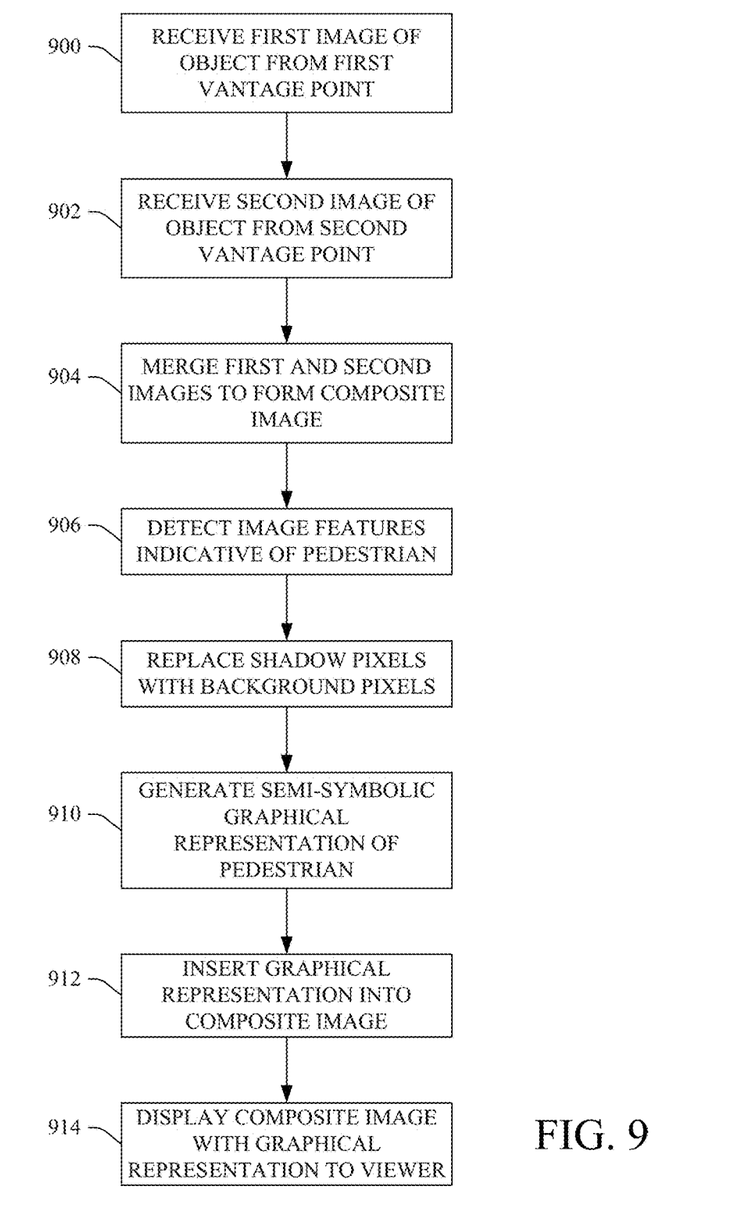
FIG. 9 illustrates a method for detecting a pedestrian in a surround-view image of a vehicle and superimposing a semi-symbolic graphical representation of the pedestrian in the surround-view image, in accordance with one or more features described herein.

FIG. 9 illustrates a method for detecting a pedestrian in a surround-view image of a vehicle and superimposing a semi-symbolic graphical representation of the pedestrian in the surround-view image, in accordance with one or more features described herein. At 900, a first image is captured, from a first vantage point, of an object near the vehicle. At 902, a second image is captured, from a second vantage point, of the object. A composite image is generated by merging the first and second images, at 904. At 906, the composite image is analyzed to detect one or more features indicative of a pedestrian in the composite image. At 908, pedestrian "shadow" pixels that result when blending the first and second images together are replaced with corresponding background pixels. At 910, a semi-symbolic graphical representation of the pedestrian is generated, which comprises one or more pedestrian features detected in the first and second images. The semi-symbolic graphical representation of the pedestrian is inserted into or superimposed onto the composite image at a calculated position of the pedestrian relative to the vehicle, at 912. At 914, the composite surround view image with the semi-symbolic representation is output to a display.

In one embodiment, the method further comprises replacing pedestrian shadow pixels corresponding to the pedestrian in the first image with background pixels from the second image, and replace pedestrian shadow pixels corresponding to the pedestrian in the second image with background pixels from the first image. The one or more pedestrian features may comprise, for instance, pedestrian shirt color, pedestrian pant color, pedestrian height, etc. Additionally or alternatively, an image of the pedestrian's face can be superimposed on the semi-symbolic graphical representation. Alternatively, a symbolic representation of the pedestrian's face can be generated based on the closeness of the pedestrian to the vehicle. Such representation of a pedestrian's face can be Chernoff faces or other representations.

In another embodiment, the composite image is analyzed to identify an area of disagreement D between the first and second images. At least one ray emanating from each camera through its field of view is calculated to a boundary of a more distant half, relative to each camera, of the area of disagreement D. An intersection R of camera rays is identified, wherein the intersection corresponds to a highest point of the pedestrian, and the highest point of the pedestrian is tracked as it moves past the vehicle.

In another embodiment, a shape formed by each of a front view representation and a rear view representation of the object is identified in the composite image, wherein the pedestrian is determined to be positioned where the front and rear view representations intersect in the composite image. A height of the head of the pedestrian above the ground is determined in the composite image, and the location of the head of the pedestrian is tracked as it moves past the vehicle.

The innovation has been described with reference to several embodiments. Modifications and alterations may occur to others upon reading and understanding the preceding detailed description. It is intended that the innovation be construed as including all such modifications and alterations insofar as they come within the scope of the appended claims or the equivalents thereof.

Having thus described the preferred embodiments, the invention is now claimed to be:

1. A system that facilitates detecting a person in a surround-view image of a vehicle and superimposing a semi-symbolic graphical representation of the person in the surround-view image, comprising:
    a first camera that captures a first image of a person from a first vantage point;
    a second camera that captures a second image of the person from a second vantage point;
    a processor configured to:
        generate a composite image by merging the first and second images;
        analyze the composite image to detect one or more features indicative of the person in the composite image;
        replace pixels corresponding to the person with corresponding background pixels;
        generate a height-proportional semi-symbolic graphical representation of the person that comprises one or more features corresponding to the person and detected in the first and second images;
        insert the semi-symbolic graphical representation of the person into the composite image at a calculated position of the person relative to the vehicle; and
        output the composite image with the semi-symbolic representation to a display.

2. The system according to claim 1, wherein the processor is further configured to replace pixels corresponding to the person in the first image with background pixels from the second image, and replace pixels corresponding to the person in the second image with background pixels from the first image.

3. The system according to claim 1, wherein the person is a pedestrian and the one or more features comprise one or more of:
    pedestrian clothing color;
    and
    pedestrian height in pixels.

4. The system according to claim 1, wherein the person is a pedestrian and the processor is further configured to superimpose an image of the pedestrian's face, or a similar face, on the semi-symbolic graphical representation.

5. The system according to claim 1, wherein the person is a pedestrian and the processor is further configured to execute a shape identification module that identifies a shape formed by each of a front view representation and a rear view representation of the pedestrian in the composite image, wherein the position of the pedestrian relative at the vehicle is determined to be at the point of intersection of the front and rear view representations of the pedestrian in the composite image.

6. The system according to claim 5, wherein the person is a pedestrian and the processor is further configured to determine a height of the head of the pedestrian above the ground in the composite image, and wherein the processor is configured to execute a tracking filter that tracks the location of the head of the pedestrian and to adjust the position of the semi-symbolic graphical representation to correspond to the location of the head of the pedestrian.

7. A method of detecting a person in a surround-view image of a vehicle and superimposing a semi-symbolic graphical representation of the person in the surround-view image, comprising:
    capturing a first image, from a first vantage point, of a person;
    capturing a second image, from a second vantage point, of the person;
    generating a composite image by merging the first and second images;
    analyzing the composite image to detect one or more features indicative of the person in the composite image;
    replacing pixels corresponding to the person with corresponding background pixels;
    generating a height-proportional semi-symbolic graphical representation of the person that comprises one or more features corresponding to the person and detected in the first and second images;
    inserting the semi-symbolic graphical representation of the person into the composite image at a calculated position of the person relative to the vehicle; and
    outputting the composite image with the semi-symbolic representation to a display.

8. The method according to claim 7, further comprising replacing replace pixels corresponding to the person in the first image with background pixels from the second image, and replace pixels corresponding to the person in the second image with background pixels from the first image.

9. The method according to claim 7, wherein the person is a pedestrian and the one or more features comprise one or more of:
    pedestrian clothing color; and
    pedestrian height in pixels.

10. The method according to claim 7, the person is a pedestrian and further comprising superimposing an image of the pedestrian's face on the semi-symbolic graphical representation.

11. The method according to claim 7, wherein the person is a pedestrian and further comprising identifying a shape formed by each of a front view representation and a rear view representation of the pedestrian in the composite image, wherein the pedestrian is determined to be positioned where the front and rear view representations intersect in the composite image.

12. The method according to claim 11, further comprising determining a height of the head of the pedestrian above the ground in the composite image, and tracking the location of the head of the pedestrian as it moves past the vehicle.

13. A processor configured to execute computer-executable instructions for detecting a person in a surround-view image of a vehicle and superimposing a semi-symbolic graphical representation of the person in the surround-view image, the instructions comprising:
    capturing a first image, from a first vantage point, of a person;
    capturing a second image, from a second vantage point, of the person;
    generating a composite image by merging the first and second images;

analyzing the composite image to detect one or more features indicative of the person in the composite image;

replacing pixels corresponding to the person with corresponding background pixels;

generating a height-proportional semi-symbolic graphical representation of the person that comprises one or more object features detected in the first and second images;

inserting the semi-symbolic graphical representation of the person into the composite image at a calculated position of the person relative to the vehicle; and outputting the composite image with the semi-symbolic representation to a display.

14. The processor according to claim 13, the instructions further comprising replacing pixels corresponding to the person in the first image with background pixels from the second image, and replace pixels corresponding to the person in the second image with background pixels from the first image.

15. The processor according to claim 13, wherein the person is a pedestrian and the one or more features comprise one or more of:
pedestrian clothing color;
and
pedestrian height in pixels.

16. The processor according to claim 13, wherein the person is a pedestrian, the instructions further comprising superimposing an image of the pedestrian's face on the semi-symbolic graphical representation.

17. The processor according to claim 13, wherein the person is a pedestrian, the instructions further comprising identifying a shape formed by each of a front view representation and a rear view representation of the pedestrian in the composite image, wherein the pedestrian is determined to be positioned where the front and rear view representations intersect in the composite image.

18. The processor according to claim 17, wherein the person is a pedestrian, the instructions further comprising determining a height of the head of the pedestrian above the ground in the composite image, and tracking the location of the head of the pedestrian as it moves past the vehicle.

19. An apparatus that facilitates detecting a person in a surround-view image of a vehicle and superimposing a semi-symbolic graphical representation of the person in the surround-view image, comprising:
means for capturing a first image, from a first vantage point, of a person;
means for capturing a second image, from a second vantage point, of the person;
means for generating a composite image by merging the first and second images;
means for analyzing the composite image to detect one or more features indicative of the person in the composite image;
means for replacing pixels corresponding to the person with corresponding background pixels;
means for generating a height-proportional semi-symbolic graphical representation of the person that comprises one or more features corresponding to the person and detected in the first and second images;
means for inserting the semi-symbolic graphical representation of the person into the composite image at a calculated position of the person relative to the vehicle; and
means for outputting the composite image with the semi-symbolic representation to a display.

20. The system according to claim 1, further comprising a disagreement calculation module configured to analyze the composite image to identify an area of disagreement D between the first and second images.

21. The system according to claim 20, further comprising a ray calculation module configured to calculate at least one ray emanating from each camera through its field of view to a boundaries of a more distant half, relative to each camera, of the area of disagreement D.

22. The system according to claim 21, wherein the person is a pedestrian and further comprising a ray intersection identification module configured to identify an intersection R of camera rays, wherein the intersection corresponds to a highest point of the pedestrian, and wherein the processor is configured to execute a tracking module configured to track the highest point of the pedestrian and to adjust the position of the semi-symbolic graphical representation to correspond to the tracked point.

23. The method according to claim 7, wherein the person is a pedestrian and further comprising:
analyzing the composite image to identify an area of disagreement D between the first and second images;
calculating at least one ray emanating from each camera through its field of view to a boundaries of a more distant half, relative to each camera, of the area of disagreement D; and
identifying an intersection R of camera rays, wherein the intersection corresponds to a highest point of the pedestrian, and tracking the highest point of the pedestrian as it moves past the vehicle.

24. The processor according to claim 13, wherein the person is a pedestrian, the instructions further comprising:
analyzing the composite image to identify an area of disagreement D between the first and second images;
calculating at least one ray emanating from each camera through its field of view to a boundaries of a more distant half, relative to each camera, of the area of disagreement D; and
identifying an intersection R of camera rays, wherein the intersection corresponds to a highest point of the pedestrian, and tracking the highest point of the pedestrian as it moves past the vehicle.

25. The system according to claim 1, further comprising a facial recognition module configured to analyze image data of the person's face and identify a facial image having a clarity or resolution above a predetermined threshold.

26. The system according to claim 25, further comprising a facial warping module configured to place the identified facial image onto the semi-symbolic graphical image.

27. The system according to claim 1, wherein the one or more features indicative of the person include clothing color, and wherein the processor is further configured to identify at least one of pant and shirt color and render the at least one of pant and shirt color in the semi-symbolic graphical representation.

* * * * *